US006686542B2

(12) United States Patent
Zhang

(10) Patent No.: US 6,686,542 B2
(45) Date of Patent: Feb. 3, 2004

(54) CABLE CLAMP

(75) Inventor: Jun-Wu Zhang, Kunsan (CN)

(73) Assignee: Hon Hai Precision Ind. Co., Ltd., Taipei Hsiena (TW)

( * ) Notice: Subject to any disclaimer, the term of this patent is extended or adjusted under 35 U.S.C. 154(b) by 0 days.

(21) Appl. No.: 10/254,362

(22) Filed: Sep. 24, 2002

(65) Prior Publication Data

US 2003/0116342 A1 Jun. 26, 2003

(30) Foreign Application Priority Data

Dec. 26, 2001 (TW) ...................................... 90222983 U

(51) Int. Cl.[7] ................................................ H01G 15/00

(52) U.S. Cl. ................................ 174/74 R; 174/40 CC; 174/65 R

(58) Field of Search .......................... 174/74 R, 40 CC, 174/65 R, 73.1, 75 C; 439/458, 459, 470, 472, 474, 422, 425, 426; 385/134

(56) References Cited

U.S. PATENT DOCUMENTS 6,226,434 B1 * 5/2001 Koshiyama et al. ........ 385/134

* cited by examiner

*Primary Examiner*—Dean A. Reichard
*Assistant Examiner*—Jinhee J Lee
(74) *Attorney, Agent, or Firm*—Wei Te Chung

(57) ABSTRACT

A cable clamp used for automatic processing and assembly of cables includes a base, a pair of clamping arms and a locking piece. The base defines receiving recesses in longitudinal two ends thereof. Each clamping arm includes a pivotable section at one end thereof received in the receiving recess, a pressing section extending from the pivotable section to the center of the base, and a fixed section formed at the other end thereof. The pressing section is adapted to press a cable against an upper surface of the base. The locking piece is disposed on the base and bears against the fixed section of the clamping arm for securely retaining the clamping arm on the base. The cable clamp has a small and simple configuration which can steadily clamp cables, load and unload the cables rapidly and precisely.

10 Claims, 6 Drawing Sheets

CABLE CLAMP

BACKGROUND OF THE INVENTION

1. Field of the Invention

The present invention relates to a cable clamp, and more particularly to a cable clamp used for the automatic processing and assembly of a mini coaxial cable.

2. Description of Related Art

The quality of signal transmission through cables has an important effect on the performance of computers. Mini coaxial cable has many advantages such as small size, high tensile strength, endurance, better electrical capability and strong EMI (Electro Magnetic Interference) protection etc. Therefore, the application of the mini coaxial cable becomes more and more wide, especially when high quality of signal transmission is required. For example, a bunch of mini coaxial cables are typically used for connecting the mainboard of a notebook computer with a Compact Disc driver or a soft disk driver and so on. FIGS. 1 and 2 illustrate a single mini coaxial cable 1 which usually includes: 1) a core 11 constituted by a plurality of conductors 111 made of metal material (generally copper alloy); 2) an inner insulator 12 enclosing the core 11 which is commonly made of Teflon; 3) a metal braid 13 covering the inner insulator 12; and 4) an outer insulator 14 usually made of plastic material such as PVC.

Electrical connection between the cores of common cables and corresponding terminals of a connector is typically achieved by means of IDC (Insulation Displacement Contact). The forked insulation displacement portion of the terminal can easily pierce the outer insulator around the core and thus electrically contact with the inner conductive core. However, the mini coaxial cables cannot use IDC to achieve electrical connection between the terminals of the connector and the cores 11 thereof. Because in an IDC manner, when the forked insulation displacement portions of the terminals pierce the outer insulators 14 and the inner insulators 12, the terminals electrically connect with the metal braids 13 and the cores 11 simultaneously so that short circuit happens. Thus, at present, only soldering is adopted to achieve electrical connection between the terminals of the connector and the cores 11 of the mini coaxial cable. Referring to FIG. 3, the soldering process is as follows: first peeling a portion of the outer insulator 14 to expose a certain length of the metal braid 13, separating the metal braid 13 and soldering the separated metal braid 13 to a grounding pad 21 of a circuit board 2 mounted in the electrical connector for electrically connecting with a corresponding grounding circuit; then peeling a certain length of the inner insulator 12 to expose the core 11; and finally soldering the conductors 111 of the core 11 to signal pads 22 of the circuit board 2 for electrically connecting with a corresponding signal circuit. The circuit board 2 further has a plurality of conductive pads 23 onto which the terminals of the connector are soldered. The conductive pads 23 respectively connect with the signal circuit or grounding circuit via traces, thereby realizing the electrical connection between the terminals of the electrical connector and the core 11 of the cable 1.

The conventional process of peeling the outer insulators 14 is carried out as follows: a plurality of mini coaxial cables is first juxtaposed on an organic board and fixed in position by an adhesive tape; then the outer insulator of each cable is manually cut out by using an L-shaped scissor. But such a manner is time-consuming, laborious and ineffective. Furthermore, the metal braids 13 and the cores 11 are easily snipped and the quality is thus poor.

At present, a laser cutter is used to peel the outer insulator 14, in other words, by means of the laser light instead of the edge of a knife. The cutting depth is precisely controlled by controlling the intensity and the moving speed of the laser light. Such a cutting method ensures good cutting quality and high precision. However, a small clamp is required not only clamping the cables during the course of cutting the outer insulators but also being applicable to the product line. When the laser cutter cuts the outer insulators 14, it is also required that the clamp should be able to press the circuit board 2 against its side wall to facilitate cutting of the outer insulators 14 in a position proximate to the circuit board 2, so that the next metal braid 13 separating step can be carried out sequentially. Due to these requirements, the design of a clamp used for automatic assembling of the mini coaxial cables is very difficult.

SUMMARY OF THE INVENTION

Accordingly, an object of the present invention is to provide a cable clamp having a small and simple configuration which can steadily clamp cables, load and unload the cables rapidly and precisely. The cable clamp acts as a carrier circulating cables on the product line, thereby increasing automatization degree of the cable assembly, saving time and manpower, as well as reducing the costs of manufacturing and assembly of cables.

In order to achieve the object set forth, a cable clamp in accordance with the present invention comprises a base, a clamping arm and a locking piece. The base defines a receiving recess at one longitudinal end thereof. The clamping arm comprises a pivotable section at one end thereof rotatably received in the receiving recess, a pressing section extending from the pivotable section, and a fixed section formed at the other end thereof. The pressing section is adapted to press a cable against an upper surface of the base. The locking piece is rotatably disposed on the base and bears against the fixed section of the clamping arm for securely retaining the clamping arm on the base.

Other objects, advantages and novel features of the invention will become more apparent from the following detailed description of the present embodiment when taken in conjunction with the accompanying drawings.

DETAILED DESCRIPTION OF THE INVENTION

Reference will now be made in detail to the preferred embodiment of the present invention.

Figure 4:
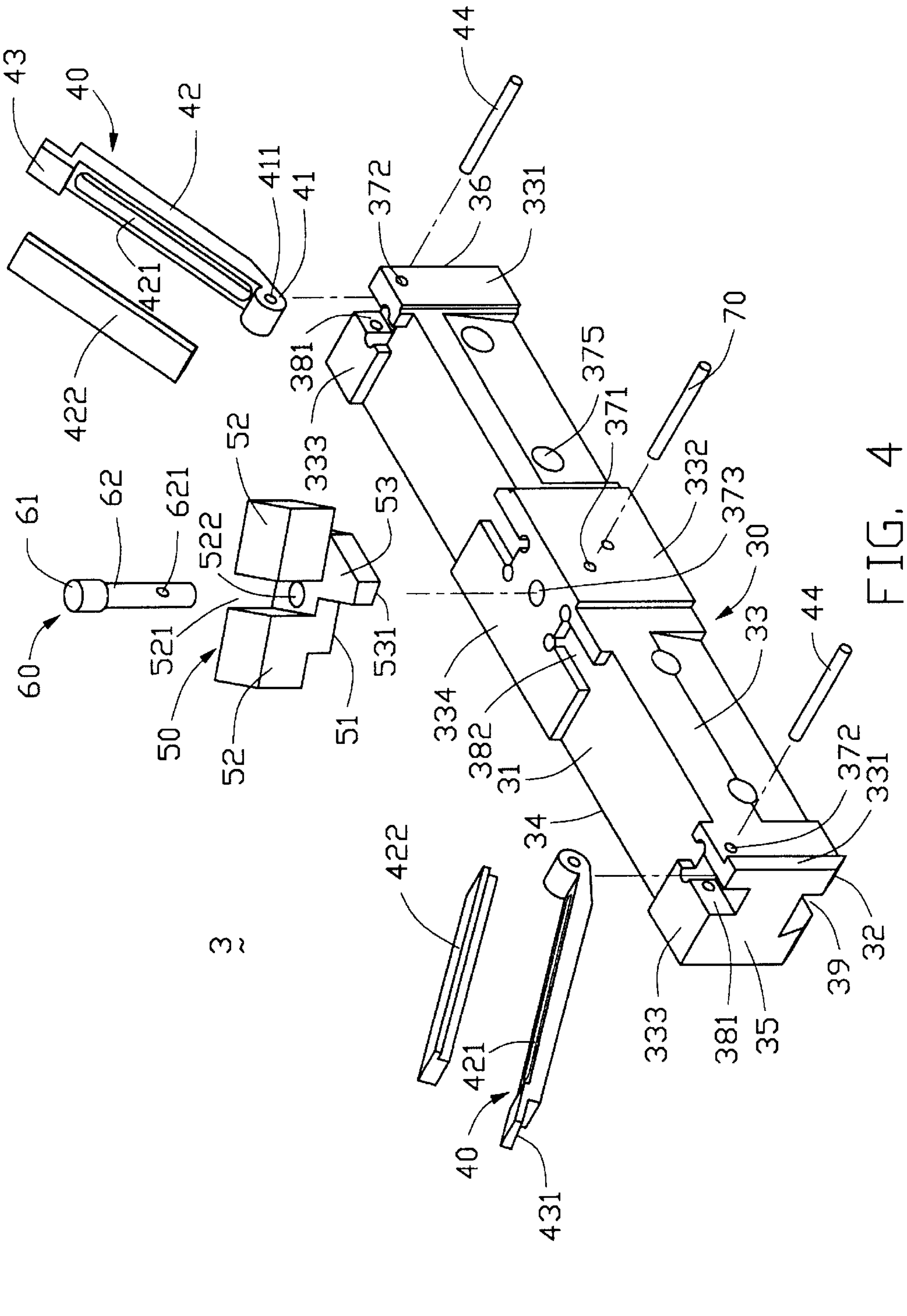
FIG. 4 is an exploded perspective view of a cable clamp in accordance with the present invention.
Figure 5:
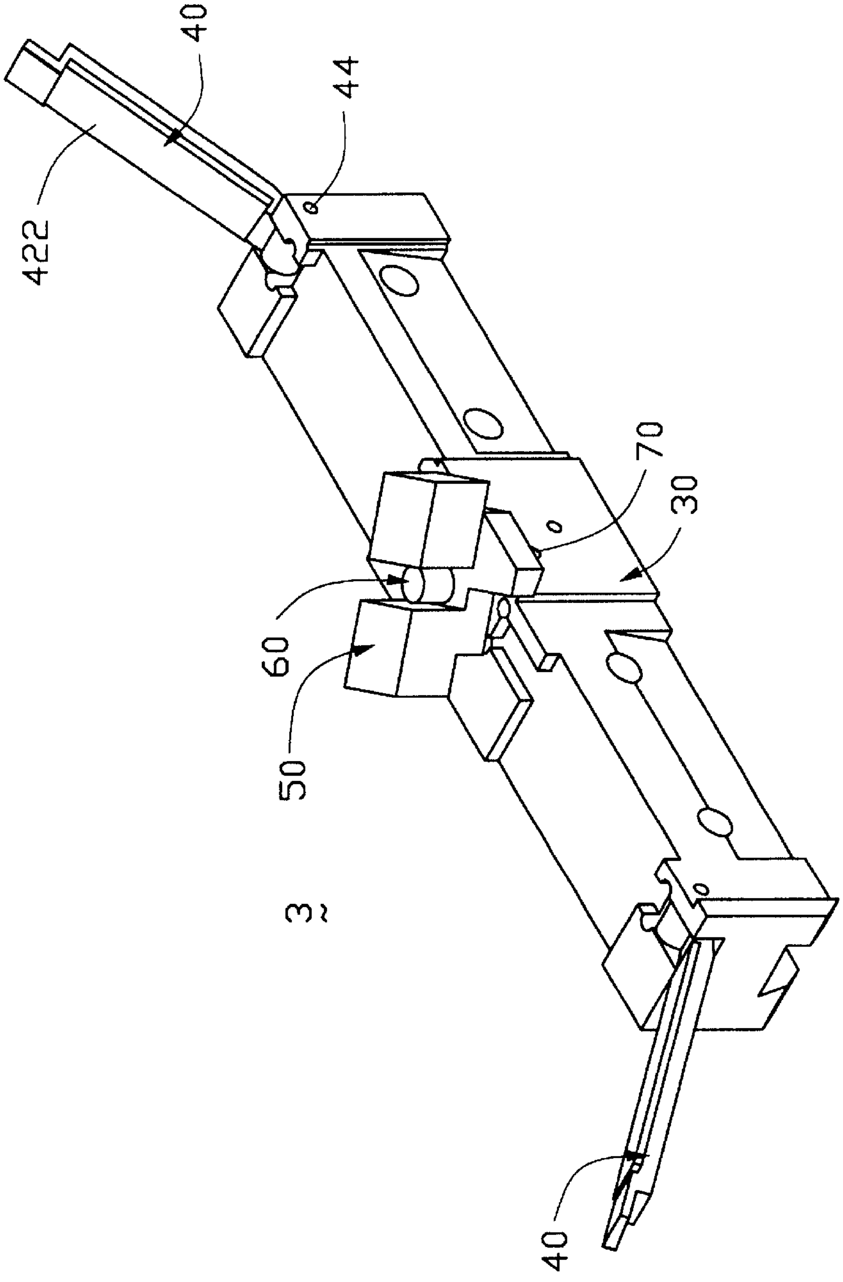
FIG. 5 is an assembled perspective view of FIG. 4.

Referring to FIGS. 4 and 5, a cable clamp 3 in accordance with the present invention is substantially made of metal material, and comprises a base 30, a pair of clamping arms 40 and a locking piece 50. The whole configuration of the cable clamp 3 is small and simple. The base 30 has an elongated shape and comprises upper and lower surfaces 31, 32 parallel to each other, longitudinal first and second side walls 33, 34 opposite to each other, and a pair of opposite traverse end walls 35, 36. The base 30 has a pair of first protrusions 331 projecting forwardly at opposite ends thereof. A second protrusion 332 projects forwardly from a middle portion of the first side wall 33 of the base 30. A first through hole 371 is defined through the second protrusion 332 and the second side wall 34. A pair of third protrusions 333 projects upwardly from opposite ends of the upper surface 31 of the base 30 proximate to the first protrusions 331. Each third protrusion 333 defines a receiving recess 381 therein. A second through hole 372 is defined through each pair of aligned first protrusions 331 and third protrusions 333. A fourth protrusion 334 projects upwardly from a middle portion of the base 30 proximate to the second protrusion 332. Opposite sides of the fourth protrusion 334 respectively define a receiving groove 382 for receiving an end of the clamping arm 40. The fourth protrusion 334 defines a third through hole 373.

Each clamping arm 40 comprises a pivotable section 41 at one end thereof rotatably received in the receiving recess 381, a pressing section 42 extending from the pivotable section 41 to the center of the base 30, and a fixed section 43 formed at the other end thereof. The pressing section 42 is adapted to press a plurality of mini coaxial cables 1 against the upper surface 31 of the base 30. The pivotable section 41 of the clamping arm 40 has a cylindrical configuration. A pivotal hole 411 is defined in the pivotable section 41 for extension of a pintle 44 therethrough. The pintle 44 sequentially extends through the second through hole 372 of the base 30 and the pivotal hole 411 of the clamping arm 40, thereby making the clamping arm 40 rotatably received in the receiving recess 381. The fixed sections 43 are retained in corresponding grooves 382 defined in opposite sides of the fourth protrusion 334. The thickness of the fixed section 43 is smaller than that of the pressing section 42, and an inclined surface 431 is provided on the fixed section 43 for guiding the rotation of the locking piece 50. The pressing section 42 defines a slot 421 in a lower surface facing the cable 1. A cushion 422 made of rubber is received in the slot 421 for contacting with the cable 1. The cushion 422 extends beyond the clamping arm 40 towards the first side wall 33 to tightly press the cable 1 against the upper surface 31 of the base 30 and protect the cable 1.

Figure 7:
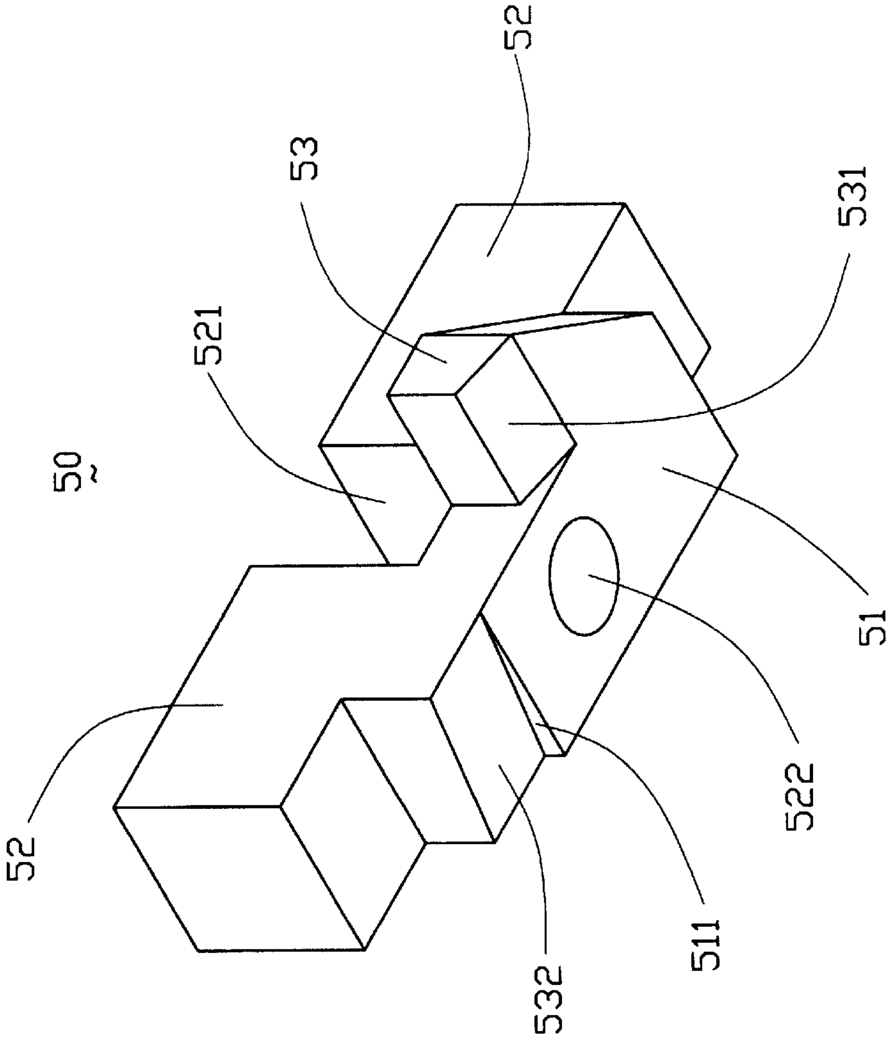
FIG. 7 is a perspective view of a locking piece of the cable clamp shown in FIG. 4 from a bottom aspect.

The locking piece 50 is positioned on a middle portion of the base 30. The locking piece 50 comprises a touching portion 51 bearing against the fourth protrusion 334 of the base 30 and the fixed section 43 of the clamping arm 40, a body 52 extending upwardly from the touching portion 51, and a guiding portion 53 extending from one side of the touching portion 51. A groove 521 is defined in the body 52. An aperture 522 is defined through the touching portion 51 in communication with the groove 521. Referring to FIG. 7, a first inclined guiding surface 531 is provided at the bottom of the guiding portion 53 along the rotary direction of the locking piece 50. An indentation 511 is defined in the bottom surface of the touching portion 51 opposite to the guiding portion 53. A second inclined guiding surface 532 is provided at the bottom of the indentation 511 along the rotary direction of the locking piece 50.

The cable clamp 3 further includes a locating pin 60. The locating pin 60 comprises a large-dimensioned head portion 61 held in the groove 521 of the locking piece 50 and a small-dimensioned pole portion 62 received in the aperture 522 of the locking piece 50. A hole 621 is defined in a lower end of the pole portion 62 corresponding to the first through hole 371. A dowel 70 is provided for extending through the first through hole 371 and the hole 621, thereby retaining the locking piece 50 on the base 30.

A plurality of assembly holes 375 is defined through the base 30 in a traverse direction. An assembly slot 39 is defined in the lower surface 32 of the base 30 and longitudinally penetrates the two end walls 35, 36. The assembly hole 375 and the assembly slot 39 are adapted to engage with corresponding parts of a conveyor rail of the product line, thereby steadily installing the cable clamp 3 onto the conveyor rail.

Figure 2:
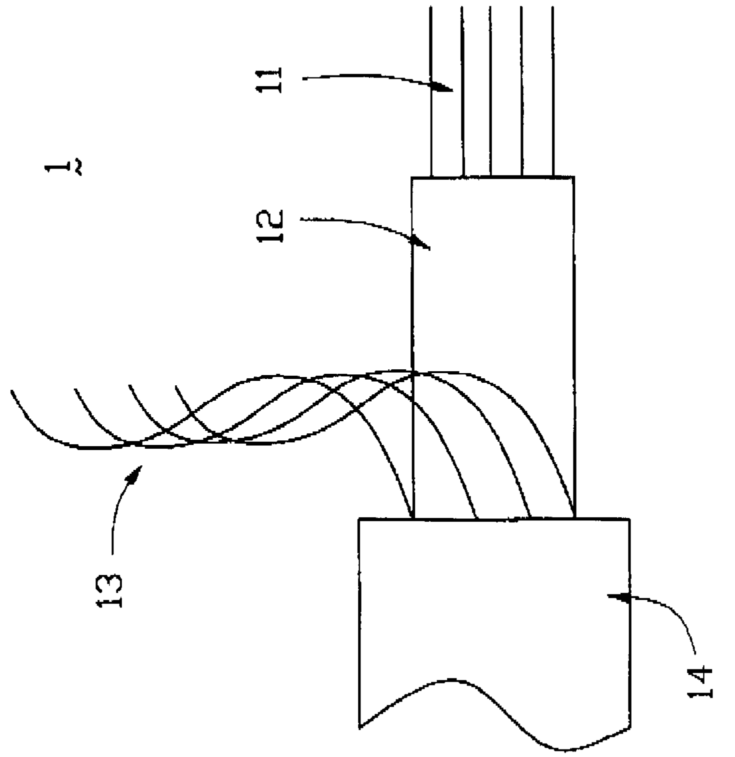
FIG. 2 (PRIOR ART)
FIG. 2 is a schematic view of a mini coaxial cable to be clamped by a cable clamp in accordance with the present invention.
Figure 1:
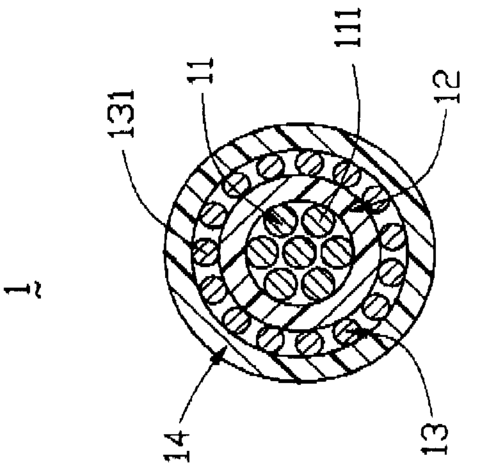
FIG. 1 (PRIOR ART)
FIG. 1 is a cross-sectional view of a mini coaxial cable to be clamped by a cable clamp in accordance with the present invention.
Figure 3:
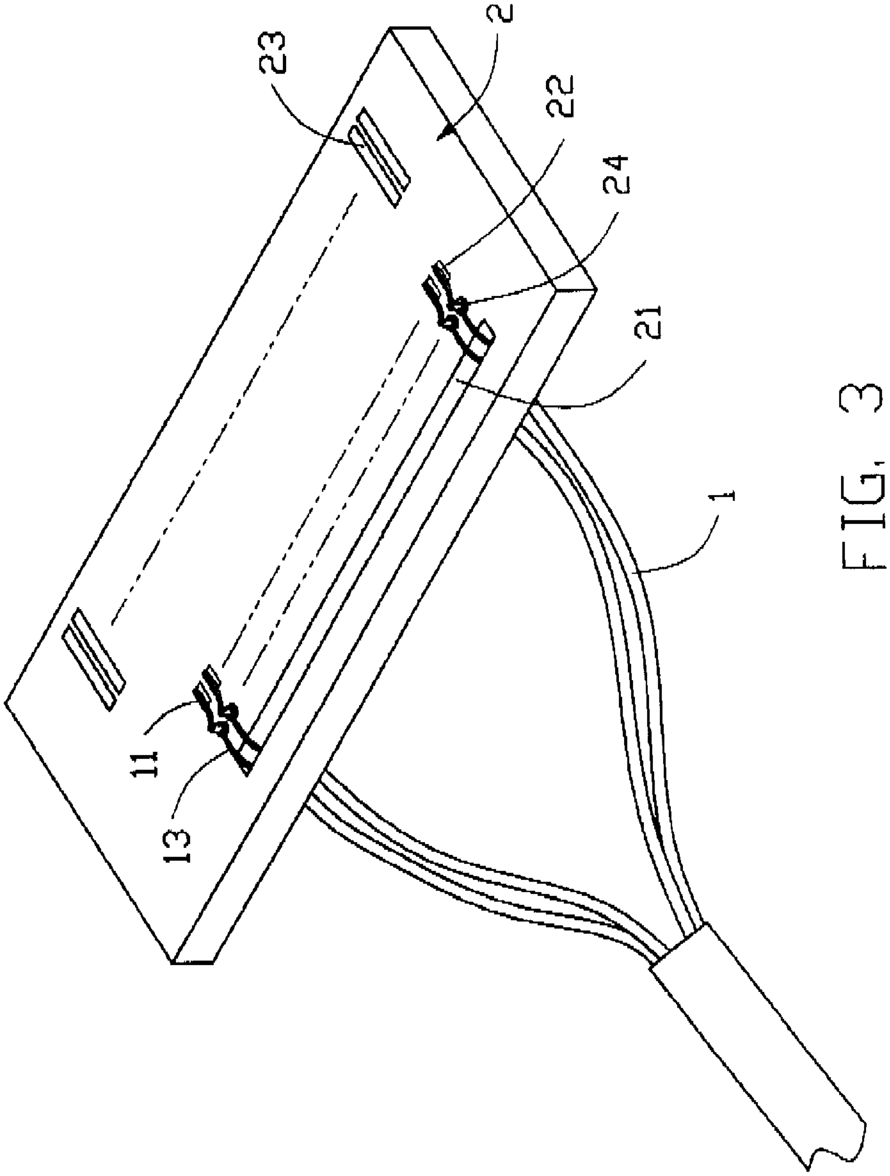
FIG. 3 (PRIOR ART)
FIG. 3 is a perspective assembled view of a bunch of mini coaxial cables and a circuit board.
Figure 6:
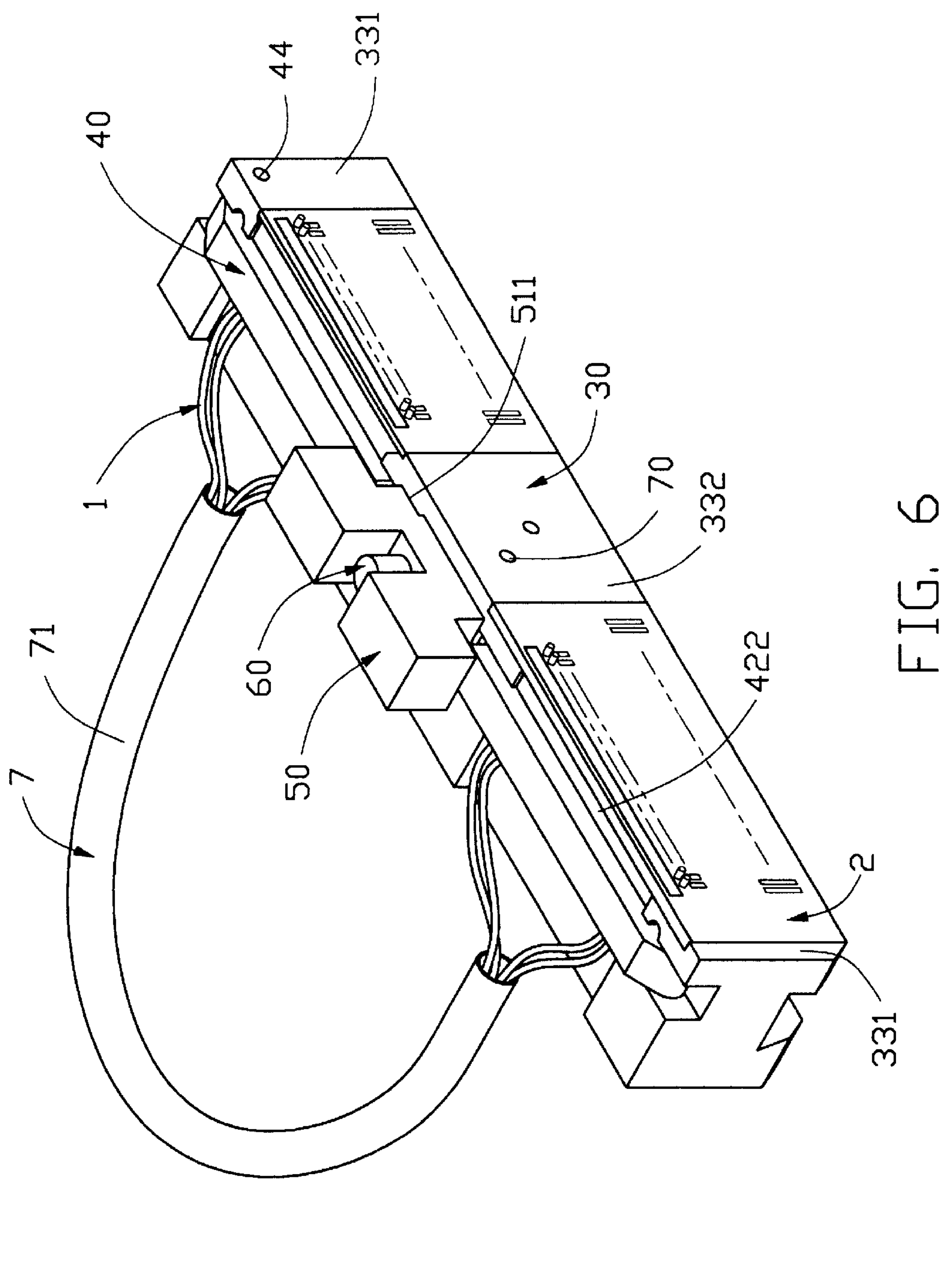
FIG. 6 is a perspective assembled view of a cable clamp in accordance with the present invention, a bunch of mini coaxial cables and a circuit board.

Referring to FIG. 6, a plurality of mini coaxial cables is bunched and enclosed by an insulative jacket 71, thereby forming a round cable 7. The mini coaxial cables 1 are peeled at opposite ends of the round cable 7. Each mini coaxial cable 1 passes through a corresponding through hole 24 of a circuit board 2 (FIG. 3). The round cable 7 whose ends are attached to two circuit boards 2 is then mounted onto the cable clamp 3 in the shape of a character "U". The mini coaxial cables 1 bear against the upper surface 31 of the cable clamp 3. The circuit boards 3 bear against the first side wall 33 of the cable clamp 3. Associated side walls of the first and the second protrusions 331, 332 bear against opposite side edges of the circuit boards 2 for securing the circuit boards 2 in position. The two clamping arms 40 rotate about the pintle 44 toward each other to engage the fixed sections 43 thereof with corresponding grooves 382 of the base 30, thereby pressing opposite ends of the mini coaxial cables onto the base 30. By manually rotating the body 52 of the locking piece 50, the locking piece 50 rotates about the locating pin 60 with the inclined guiding surfaces 531, 532 thereof sliding along the inclined surface 431 of the clamping arm 40, thereby causing the touching portion 51 to tightly bear against the fixed section 43 of the clamping arm 40. Thus, each end of the round cable 7 is securely sandwiched between the clamping arm 40 and the base 30 of the cable clamp 3. The process of loading the cable clamp 3 is rapid and precise, and the process of unloading the cable clamp 3 is also convenient and quick.

In use, the cable clamp 3 together with the round cable 7 and the circuit boards 2 is mounted onto the conveyor rail of the product line and transmitted to the laser cutter along the conveyor rail, where the cutting of the outer insulators 14 is successfully and precisely executed. The cutting operation is performed in a position proximate to the circuit board 2, and the cable 7 is continually transmitted to the next workstation to have its metal braid 13 separated. Hence, the automatization degree of cable assembly is improved, which can save time and manpower as well as reduce the costs of manufacturing and assembly of cables.

It should be understood that the cable clamp in accordance with the present invention is not limited to use with the mini coaxial cables. If a common cable is subject to the laser cutter to have its outer insulators peeled, the cable clamp of the present invention may also be used with its size slightly changed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable clamp assembly comprising:

a base defining an upward surface for clamping, and a side face for confronting a printed circuit board having a plurality of coaxial cables thereon;

a clamping arm moveably mounted to the base, and defining thereon a downward surface facing to said upward surface when said clamping arm is locked to the base, said downward surface incorporating the upward surface for tightly clamping the corresponding coaxial cables when said clamping arm is locked to the base;

a locking device rotatably located on the base and abutting against at least partially the clamping arm; and a locating pin connecting the locking device and the base for allowing the locking device to be rotated therearound; wherein said locking device not only locks the clamping arm to the base but also forces the clamping arm to press against the base for having the corresponding coaxial cables tightly sandwiched therebetween.

2. The assembly as claimed in claim 1, wherein said clamping arm is pivotally mounted to the base about a pintle, and the locking device abuts against a portion of the clamping arm opposite to said pintle.

3. The assembly as claimed in claim 1, further including another clamping arm to cooperate with said clamping arm for respectively clamping both distal ends of each of the coaxial cables so as to work on both said distal ends simultaneously.

4. The assembly as claimed in claim 3, wherein the locking device defines two guiding surfaces for successively and respectively engaging corresponding inclined surfaces on the clamping arms.

5. The assembly as claimed in claim 3, wherein the locking device comprises a touching portion bearing against the base and a portion of the clamping arm opposite to the pintle, and a guiding portion angulately extending from the touching portion.

6. The assembly as claimed in claim 5, wherein the touching portion and the guiding portion each define a guiding surface on a bottom thereof.

7. The assembly as claimed in claim 1, wherein the locating pin comprises a large-dimensioned head portion pressing against the locking device and a small-dimensioned pole portion extending trough the locking device and into the base.

8. The assembly as claimed in claim 7, further comprising a dowel, and wherein the pole portion defines a hole in a lower end thereof, and wherein the base defines a through hole commumicating with the hole of the pole portion, the dowel traversing the through hole of the base and the hole of the pole portion for retaining the locating pin in the base.

9. The assembly as claimed in claim 2, wherein the base defines a receiving groove for receiving the portion of the clamping arm opposite to the pintle.

10. The assembly as claimed in claim 1, further comprising a cushion attached to the downward surface of the clamping arm for contacting with the coaxial cables.

* * * * *